UNITED STATES PATENT OFFICE.

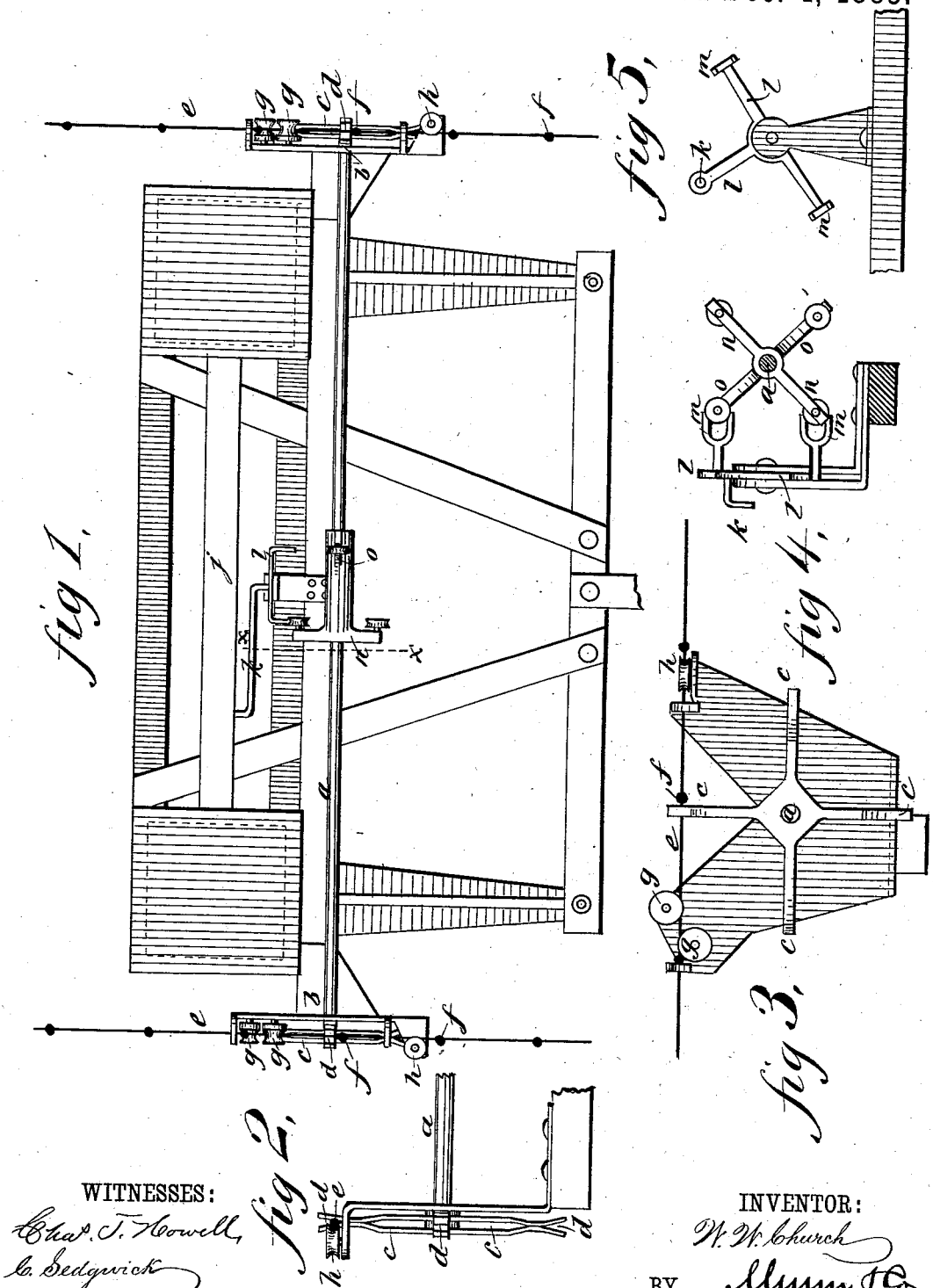

WALTER WILLIS CHURCH, OF CARTHAGE, MISSOURI.

CHECK-ROW CORN-PLANTER.

SPECIFICATION forming part of Letters Patent No. 289,619, dated December 4, 1883.

Application filed April 17, 1883. (No model.)

*To all whom it may concern:*

Be it known that I, WALTER W. CHURCH, of Carthage, in the county of Jasper and State of Missouri, have invented a new and Improved Check-Row Corn-Planter, of which the following is a full, clear, and exact description.

The object of the invention is to improve check-row corn-planters, as hereinafter described, and pointed out in the claim.

Reference is to be had to the accompanying drawings, forming part of this specification, in which similar letters of reference indicate corresponding parts in all the figures.

Figure 1 is a plan view of my improved check-row corn-planter. Fig. 2 is a side elevation of a portion of the apparatus, showing the devices for working the shaft of the check-marker. Fig. 3 is an end elevation of the devices for working the shaft of the check-marker. Fig. 4 is a detail in section on line $x$ $x$, Fig. 1, showing the contrivance for working the dropper-slide; and Fig. 5 is another detail of the dropper-slide device.

I propose to arrange the check-marker shaft $a$ in its bearings at $b$, or in any approved bearings, so as to revolve continuously, and provide it with arms $c$, having crotched ends $d$ for the check chain or cord $e$ to run in for turning the arms by the joint knobs or projections $f$, by which the links of the chain are connected, or other knobs applied for the purpose, the said forked ends of the arms being sufficiently long or deep in the crotch to enable the shaft to be turned a quarter of a revolution by one arm, so that continuous rotation will be had with four arms, one arm being engaged at the same time that another is disengaged. I also propose to have a set of these shaft-working arms attached to each end of the shaft, and provided with a chain or cord, and the arms of the two ends of the shaft may break joints, so to speak, for more efficient operation. The check-chains run along guide-rollers $g$ and $h$, to properly guide it to the arms of the check-shaft. Marking device may be attached to the shaft in any approved way, which it is not necessary to show. For operating the dropper-slide $j$ from this shaft $a$, I connect the slide with a cranked arm, $k$, having a vibrating T-head, $l$, which has a forked arm, $m$, at each end of the T, with which the two pairs of arms $n$ $o$ on the shaft $a$, and having rollers at the ends, alternately engage to shift the bar $j$ forward and backward, according as the opposite ends of the T are actuated by said arms. This makes a simple and efficient contrivance, by which the motion for the dropper-slide may be had from the check-marker shaft.

Having thus fully described my invention, I claim as new and desire to secure by Letters Patent—

The cranked arm $k$, having vibratory T-head $l$, with forked arms $m$ $m$, in combination with the arms $n$ $o$, arranged on shaft $a$ and having rolls at their ends, whereby the bar $j$ may be shifted, as described.

WALTER WILLIS CHURCH.

Witnesses:
N. O. MERCER,
JAMES P. BETTS.